(12) United States Patent
Saporetti

(10) Patent No.: US 10,225,502 B2
(45) Date of Patent: Mar. 5, 2019

(54) METHOD AND APPARATUS FOR ACQUIRING IMAGES ON MOVING SURFACES

(71) Applicant: Datalogic IP Tech S.R.L, Bologna (IT)

(72) Inventor: Claudio Saporetti, Lippo di Calderara di Reno (IT)

(73) Assignee: Datalogic IP Tech S.R.L., Calderara Di Reno, Bologna (IT)

( * ) Notice: Subject to any disclaimer, the term of this patent is extended or adjusted under 35 U.S.C. 154(b) by 0 days.

(21) Appl. No.: 14/655,244

(22) PCT Filed: Dec. 28, 2012

(86) PCT No.: PCT/IT2012/000402
§ 371 (c)(1),
(2) Date: Jun. 24, 2015

(87) PCT Pub. No.: WO2014/102837
PCT Pub. Date: Jul. 3, 2014

(65) Prior Publication Data
US 2015/0334325 A1 Nov. 19, 2015

(51) Int. Cl.
*H04N 5/335* (2011.01)
*H04N 5/374* (2011.01)
*H04N 5/376* (2011.01)

(52) U.S. Cl.
CPC ........... *H04N 5/374* (2013.01); *H04N 5/3743* (2013.01); *H04N 5/3765* (2013.01)

(58) Field of Classification Search
CPC .............................. H04N 5/378; H04N 5/3743
See application file for complete search history.

(56) References Cited

U.S. PATENT DOCUMENTS

| 4,814,607 A | * | 3/1989 | Hofmann ............. G03B 15/006 250/235 |
| 6,137,634 A | * | 10/2000 | Li ............................. G01J 1/04 359/619 |
| 7,385,743 B2 | | 6/2008 | Gagliano et al. |

FOREIGN PATENT DOCUMENTS

EP 2 458 848 A1 5/2012

OTHER PUBLICATIONS

Cheng et al; "Time-delay integration readout with adjacent pixel signal transfer for CMOS image sensor"; 2012; International Symposium on VLSI Design, Automation, and Test (VLSI-DAT); pp. 1-4.*

(Continued)

*Primary Examiner* — Gary C Vieaux
(74) *Attorney, Agent, or Firm* — Dentons US LLP

(57) ABSTRACT

The invention relates to a sensor for the recognition of images on surfaces of objects in relative motion with regard to the sensor, especially for reading optical codes and/or characters and/or symbols on a surface of an object, comprising a plurality of sensor lines, each adapted to render line images in a temporal sequence, wherein the sensor is arranged to combine a plurality of line images of said sensor lines to yield a line image of the sensor, wherein each of said plurality of line images was captured by a different one of said sensor lines and at least some of said plurality of line images were captured at different points in time. The invention also relates to a corresponding method for the recognition of an image on a surface of an object and to a system for the acquisition of images on a surface of a moving target, comprising a conveyor for carrying target objects and a sensor as described above.

22 Claims, 6 Drawing Sheets

(56) References Cited

OTHER PUBLICATIONS

Written Opinion of the International Searching Authority of PCT/IT2012/000402 dated Jul. 9, 2015, 9 pps.

* cited by examiner

METHOD AND APPARATUS FOR ACQUIRING IMAGES ON MOVING SURFACES

CROSS REFERENCE TO RELATED APPLICATIONS

This application is a 371 National Stage application of International Application No. PCT/IT2012/000402, filed Dec. 28, 2012, which is incorporated herein by reference in its entirety.

BACKGROUND OF THE INVENTION

Field of the Invention

The present invention relates to capturing images from target surfaces in relative motion with regard to a camera or sensor, especially from moving surfaces that are not orthogonal to the optical axis of a sensor or camera, more particularly the acquisition of two-dimensional images by linear sensors on such surfaces. The invention especially relates to the acquisition of characters and/or symbols and/or optical codes on such surfaces, such as barcodes, two-dimensional optical codes, and the like, by means of linear sensors.

Description of Related Art

It is known to take a two-dimensional image from a moving surface, especially an image of characters or of optical codes, by means of a linear sensor or camera, which takes subsequent images of a target surface at predetermined time intervals, while the target and the camera are moving relative to each other. If, as is illustrated in FIG. 1, the sampling frequency of the linear camera is appropriately tuned to the relative speed of the target, the linear camera (CCD) will take images along adjoining lines. To this end, the sampling frequency has to be chosen in such a way that during the time between sampling two images, the target moves by a pixel width (here and subsequently it will be assumed that exposure times are negligible). This is illustrated in FIG. 1. If the linear camera covers a line of width L at time $T_1$, at an appropriate time $T_2$, which differs from time $T_1$ by the inverse of the sampling frequency, a second line, adjoining the first line and having the same width L, will be imaged. Thus, consecutive line images will be taken, which will then be combined to form a 2D image for further processing, such as the recognition of characters or of optical codes on a surface.

FIG. 1 shows a case where the optical axis of the sensor is perpendicular to the surface of the target. Especially with automated systems for recognition of optical symbols, characters or codes, this is frequently not the case. For example, if optical codes are to be recognized on articles carried on a conveyor, the optical axis of a camera mounted above the conveyor may include an angle of less than 90° with the conveyor surface. Additionally, the upper surface of the article may be inclined to the conveyor surface. Thus, the angle between the upper surface of the parcel and the optical axis of a camera may not only be different from 90°, but may also vary. If the camera is located at the side of the conveyor, the standard situation is that the target surface is not orthogonal to the optical axis of the camera. Since usually the target objects will be put on a conveyor in random orientation, they will not be aligned in any particular manner on the conveyor and hence also not in relation to the sensor.

This problem was addressed in the prior art for image acquisition or code acquisition systems using conventional linear cameras or sensors, see, for example, U.S. Pat. No. 7,385,743 B2 or EP 2 026 249 A1. As is illustrated in FIG. 2, if the normal line of the target surface is inclined to the optical axis of the camera by an angle γ, the projection of the camera pixels on the target (image pixels) will no longer be squares, but rectangles and the width L' of an image pixel taken by the camera will be larger than the line width L in the orthogonal case. In consequence thereof, if in the situation of FIG. 2 equidistant subsequent lines of a given width are to be captured, the sampling interval or integration interval, i.e. the inverse of the sampling frequency, needs to be adjusted as a function of γ so that 2D images with equidistant lines on the target can be reconstructed. In most cases the selected frequency will cause the camera to capture an image that extends beyond the borders of a line into the neighbouring lines, if the target surface is tilted from the orthogonal orientation. This effect is illustrated in an exaggerated manner in FIG. 2. In most cases this partial overlap with neighbouring lines will, however, be small and not affect the image quality too much.

Linear cameras or linear image sensors have an intrinsic problem in that their integration interval is rather small. They therefore need excellent lighting conditions for proper imaging, which in consequence means that they require very open diaphragms, resulting in a reduced depth of field.

If optical codes, characters or symbols are read on moving objects, such as on parcels on a conveyor, the field of view (FOV) needs to be wide and the required depth of field is large. The small depth of field of conventional linear cameras is therefore a disadvantage in such applications. Thus, especially in code recognition applications, the results will not always be satisfactory. This will especially be the case with less than optimum lighting conditions, which prevail in many practical applications.

The problem of low sensitivity of line sensors can, to some extent, be dealt with by improving the lighting conditions, i.e. by providing dedicated light sources synchronized with the sampling times of the sensors to improve the lighting conditions. Such a solution is, for example, known from the Datalogic NVS9000 camera applications and from EP 2 126 781 B1.

However, this solution is expensive in that it requires additional hardware, synchronization between the light sources and the sensors and careful system calibration so that the illumination area of a light source, on the one hand, coincides with the field of view of the corresponding line sensor and, on the other hand, the light from a light source dedicated to a line sensor does not interfere with the operation of other line sensors that may also be installed in a code or symbol reading station.

Outside the field of optical identification and code or symbol recognition, so-called time-delay integration sensors (TDI sensors) have been used, which consist of a plurality of electrically connected parallel sensor lines (TDI stages), wherein each of these lines acquires an image of the same line on a moving object and the output of the various line sensors is added, thereby effectively enhancing the sensitivity of the entire sensor. The known TDI sensors are not suitable for detecting 2D images on surfaces that are not orthogonal to the optical axis of the camera or the TDI sensor as they require a careful synchronization between the movement of the target and the sampling frequency of the sensor lines in order to safeguard that an image of the same line will be repeatedly captured by different sensor lines.

BRIEF SUMMARY OF THE INVENTION

It is the object of the present invention to provide a method and apparatus for capturing 2D images from moving surfaces by means of line sensors that provides for improved sensitivity.

This object is accomplished by a sensor comprising a plurality of sensor lines, each adapted to render line images in a temporal sequence, wherein the sensor is arranged to combine a plurality of line images of said sensor lines to yield a line image of the sensor, wherein each of said plurality of line images was captured by a different one of said sensor lines and at least some of said plurality of line images were captured at different points in time, wherein the sensor lines are arranged such that the time difference between those two of these different points in time that are closest to each other equals a first time interval ($P_t$), and wherein each of these sensor lines is arranged such that, having captured the image that is to be combined to said line image of the sensor, the next image in said temporal sequence will be taken after a second time interval (P), wherein the sensor is adapted to operate with the second time interval being less than the first time interval.

Said arranging may comprise geometrical, optical and/or electrical arrangements.

In this context, the term "sensor" is given a broad meaning and encompasses, but is not limited to cameras or other image acquisition devices rendering an image of a line or stripe of a target surface and being able to be operated to render a temporal sequence of line images. A sensor in this sense may comprise a plurality of units, e.g. a measuring unit and an evaluation unit.

A sensor of the present patent may especially be a time-delay integration sensor (TDI sensor). A sensor according to the patent may be based on CCD or on CMOS technology.

The patent especially provides for the use of the above-mentioned sensor and its various embodiments for the recognition of an image on surfaces of articles or other targets in relative motion to the sensor, in particular on articles that are moving past the sensor on a conveying device, and especially for the use of such sensors for reading optical codes and/or characters and/or symbols on a surface of an article or another target in relative motion to the sensor.

A sensor according to the patent may have M sensor lines, wherein M is a natural number larger or equal to 2. For the currently contemplated embodiments M may be any number from 2 to 128, but may also be higher, depending on the sensitivity requirements.

According to the patent, the lines composing the sensor are usually parallel and at the same distance one from the other, but this is not mandatory.

Said combining a plurality of line images to yield a line image of the entire sensor may involve adding up the signals of said sensor lines, more specifically adding up the output of corresponding pixel elements of these lines. It may, however, also be contemplated to add the output with a weight assigned to each sensor line and/or each sensor element in a line. More generally, the output of the entire sensor may be a linear combination of the output of the sensor lines and the output for a given sensor pixel may be a linear combination of the output of corresponding sensor pixels. More complex operations known in the field of image processing may, however, also be used to generate the sensor output. In any case, the result of said combining is an output signal or output values of the entire sensor for the line and its constituent pixel elements, respectively, that are higher or stronger than the output signal or values of an individual sensor line. In other words, by combining corresponding images of different sensor lines, the output and thus the sensitivity of the sensor as a whole is enhanced.

A sensor according to the patent may be arranged to generate 2D-images by combining a plurality of line images of different regions of the target, especially images taken at different times while the target is moving with regard to the sensor (or vice versa). Usually these regions will be adjoining or slightly overlapping lines or stripes on the target surface. Preferably, these lines on the target surface are orthogonal to the sensor axis. When a 2D-image is generated in this manner, the time interval between capturing different line images with a sensor line will determine the resolution in the direction perpendicular to the image lines. Typically, the frequency at which a sensor line renders line images, to be combined to a 2D-image, is the inverse of the above-mentioned second time interval. If this frequency is constant, the line images will be output at intervals corresponding to said second time interval.

A sensor according to the patent may assemble a plurality of line images to yield a 2D-image itself, but it may also be coupled to another device that will perform this assembling task with suitable hardware and/or software.

Preferably, all of said plurality of line images are captured at different points in time. It may, however, also be provided to combine groups of line images from different sensor lines, wherein the line images in any group were captured simultaneously or almost simultaneously and each group of line images was captured at a different point in time. This embodiment does, however, require a very precise synchronisation between the sensor lines in a group to make sure they capture, within tolerable limits, the same image.

It may further be provided that any two of said different points in time that are immediately subsequent to each other differ by said first time interval ($P_t$). In other words, the difference between any two of these points in time is said first time interval or a multiple thereof. It may, however, also be provided that some or all pairs of two of said different points in time differ by an individual time interval that is larger than the second time interval. Generally, the time interval between two sensor lines capturing line images to be combined to a line image of the sensor should be chosen such that each of said sensor lines captures the same or essentially the same image. Especially in image recognition applications the line images captured by the different sensor lines may differ only to such an extent that it is still possible, given the case after suitable processing, to perform image recognition on the combined final image that is created by the sensor or an image acquisition system comprising said sensor.

It may also be provided that, for each sensor line, in said temporal sequence or at least in a part thereof that comprises the line image to be combined, especially that part that comprises all lines that constitute a 2D image to be captured by the sensor, line images are taken at intervals that equal said second time interval. In other words, at least in part of said sequence, the sensor lines sample with a fixed sampling rate determined by said second time interval.

The sensor may be arranged such that the first and/or second time interval and/or the relation between the two is fixed. It may, however, also be provided that the first and/or second time interval can be set in the sensor such that the first time interval is larger than the second time interval.

The patent especially provides a sensor comprising a plurality of sensor lines, each rendering line images, wherein the sensor is arranged to combine a plurality of line images, each of which was captured by a different one of said sensor lines and each of which was captured at a different time, to yield a line image of the entire sensor, wherein the sensor is arranged to combine line images of different sensor lines that were captured at times that differ by a first time interval ($P_t$) or a multiple thereof and wherein the individual sensor lines are arranged to capture line images at times that differ by a second time interval (P) or a multiple thereof, wherein the second time interval can be set to be less or equal to the first time interval.

In some embodiments of the sensors described above said first and second time intervals may be set to be constants. Thus the sampling process of an individual sensor line may be periodic and/or the delay between two subsequent images taken by two different sensor lines may be constant while acquiring a line image of the entire sensor, while acquiring a 2D image on a surface or while acquiring images on different surfaces. These intervals may, however, change from target to target and even change while acquiring an image from a target surface, such as an optical code, a symbol, character(s) or the like. Thus, the sampling interval of a sensor line may be the same for two or more cycles of the sensor lines, but this is not necessarily the case. Likewise, the delay between sensor lines when acquiring corresponding images may vary from line to line being captured.

It may be provided that said first time interval depends on the target velocity and/or the distance of the target from the sensor and/or the angle of the target velocity vector to a plane orthogonal to the optical axis of the sensor.

In one embodiment it is provided that the sensor is arranged to determine the first time interval on the basis of said velocity and/or distance and/or angle. The value of these quantities may be input by a user through a user interface comprised in the sensor or connected thereto, but may also be received from other devices at an input of the sensor or derived from the input from other devices. These may e.g. be devices that are part of a code or symbol reading station, together with the sensor. The value of these quantities may also be determined based on input from a user and/or data or signals received from other devices. Alternatively, the first time interval may be directly input by a user through a user interface in or connected to the sensor or provided by another device that is connected to the sensor or otherwise derived from data provided by another device.

Said first time interval may be calculated from a formula or using a given algorithm. In one embodiment, the first time interval $P_t$ may be given by $$P_t(V,d) = S'(d)/V'.$$

If the projection of the sensor lines on the target surface is perpendicular to the direction of movement of the target, as will be the case with most applications where articles are carried on a conveyor, V' is the component of the target velocity on the target surface. In a more general case, V' would be the value of the target velocity component in the direction perpendicular to the projection of the sensor lines on the target surface. In the above formula, S' is the distance between the projection of two subsequent lines of the sensor on the target surface at distance d from the sensor. In cases where the optical axis of the sensor is perpendicular to the target surface from which the image is acquired, S' equals S, the distance between the projection of two subsequent lines of the sensor on a plane perpendicular to the optical axis and at the same distance from the sensor as the target surface. S and S' are related by a factor depending on the angle between the target surface and a plane perpendicular to the optical axis. In many cases S' and S, respectively, will be identical to the line widths L' and L, which were discussed above with reference to FIGS. 1 and 2. There are, however, embodiments where the distance between the projection of two sensor lines on the surface will not be identical to the line or pixel width, even though both sensor lines each capture the same line image.

S' is a function of the optics of the sensor and/or of the optics used to guide the light from the target to the sensor in an image acquisition system, such as a code or symbol reading station. The relationship between S' and d will vary with the optics used. In some embodiments it may be calculated from a given exact or approximate formula. Alternatively, the relationship between S' and d may be stored in a table listing values of d and the corresponding S' value and the required value of S' may be read out from this table or interpolated from the values in this table. Preferably, the table is stored in a storage medium in and accessible by the sensor, but it may also be stored in an external device, to be accessed by the sensor for determining S' in dependence of d. Alternatively, it may be stored in and/or accessed by another device used for determining S'. The above, of course, equally applies to the quantity S. Preferably, the relationship between S and d is stored and a corresponding value of S' is calculated from the S value in dependence of the angle between the optical axis of the sensor and the target surface. The use of a table with predetermined relationships between S' values (or S values) and d will especially be advantageous, if the relationship between S' (or S) and d is complex or can only be determined experimentally or if computation time is an issue, which is frequently the case in real time determinations. This may e.g. be the case, if several target objects pass the sensor and the first time interval $P_t$ is set differently for each individual target object, depending on the distance of the sensor from the target surface being imaged. A typical example of a case where real time determinations are an issue are parcel or luggage sorting systems, wherein the individual objects to be sorted are recognized and directed according to the content of a code on the target that is read out and processed at a code reading station in the system.

If it is not known in advance, the distance of an individual target object from the sensor can be determined in various ways. For example, according to the patent it may be provided that the sensor itself determines its distance from the target by e.g. triangulation, time-of flight methods, using the phase difference between emitted light and the light reflected from the target, or other methods known in the art. Alternatively, the distance or an approximation of the distance may also be provided by another device that is used together with the sensor e.g. in a code or character reading station. The speed V may also be measured by the sensor or an external device. Especially the speed may be determined from the difference of the points in time when an edge or another distinguished feature of the target object is detected by different sensor lines of the sensor. Alternatively, the speed of the target may be determined by external measuring equipment and delivered to the sensor. In conveyor applications, the conveyor speed (and hence the target speed) may be determined e.g. by using an encoder determining the advance of the conveyor in a given time interval. The output of this encoder may be provided to the sensor or another device calculating the first time interval as an input signal indicating the speed of the target object.

In an embodiment the first time interval $P_t$ may be given by $$P_t(V, d, \alpha) = \frac{S(d)}{V * \cos(\alpha)}$$

wherein S(d) is the distance between the projection of two subsequent lines of the sensor to a plane orthogonal to the camera axis and at the same distance from the sensor as the target surface. V is the absolute value of the speed and α is the complementary angle to the angle between the velocity vector and the optical axis. In applications with a stationary reading device and a conveyor, the angle α is a constant of the system and can be input to the sensor as part of the system settings in a usual manner, e.g. through a user interface or a configuration device interacting with the sensor. In principle, it is, however, also possible to determine the angle α while the target object is passing the sensor. For example, in an application where the sensor is stationary, this angle may be determined from the known direction of the optical axis of the sensor and the direction of movement, which in turn may be e.g. determined from the position in space of an edge point or another distinguished point of the target object at two different points in time.

It may also be provided that said second time interval is dependent on the target velocity and/or the distance of the sensor to the target and/or the angle between the target surface and a plane perpendicular to the optical axis.

Additionally or alternatively, the second time interval may depend on the angle between the optical axis and the line of intersection of the target surface with the plane defined by the optical axis and the vector of the target velocity. As in the case of the first time interval, the second time interval may be determined by the sensor based on data input by a user and/or data received from other devices through one or more inputs of the sensor or it may be directly input by a user or received as input from another device.

It may also be provided that the second time interval depends on the angle of the target velocity vector to a plane orthogonal to the optical axis of the sensor.

A sensor according to the patent can be implemented in an analogue manner or in a digital manner.

In an analogue implementation, a dedicated storage element may be provided to each light sensitive element of a sensor line, e.g. a CCD sensor element or a CMOS sensor element. The sensor elements in each sensor line will be triggered with a frequency that is the inverse of the second time interval P to acquire an image of a line. At the end of each image acquisition cycle or sampling cycle the accumulated charge of each sensor element in a sensor line will be transferred to its dedicated storage element. Additionally, except, of course, for the first sensor line, triggering the sensor elements of a specific sensor line will also cause, for each sensor element in said sensor line, the transfer of the charge stored in the corresponding dedicated storage element of the previous line to said sensor element. According to this embodiment and contrary to conventional TDI sensors, each sensor line is triggered independently from the other sensor lines and the dedicated trigger signal for each line is delayed with regard to that of the previous line by a time delay corresponding to the difference between the first and second time interval. Thus, whereas in a conventional TDI sensor all lines are triggered simultaneously, thereby causing the charge to be transferred to the next line at the end of each sampling cycle, in this embodiment the transfer of charge between corresponding elements of adjacent lines will be delayed.

In a digital implementation, a common trigger signal may be used for all sensor lines and a delay between sampling cycles of subsequent lines may be provided by suitable means. Likewise, the output of one or more sensor lines, preferably all but the last, may be delayed by suitable means for it to be added to the output of one or more subsequent sensor lines. These delays may be accomplished by suitable hardware or, in a software solution, by buffering the respective data for a certain time in a suitable buffer storage medium.

A digital implementation has the advantage that totally independent sensor lines may be used, the output of which is added up, processed by forming a linear combination, or otherwise combined to yield the sensor output. Moreover, more complex dependencies of the first and second time interval on other quantities and parameters can be easily implemented and also easily changed or replaced, if needed.

It may further be provided that the sensor comprises a sequence of adjacent, preferably parallel sensor lines, wherein the sensor is arranged such that the start of the sampling interval of each sensor line (except, of course, the first that does not have a preceding line) is delayed with regard to the sampling interval of an immediately preceding sensor line by a time delay, which preferably is the same for all lines.

If T is said time delay, the second line will be delayed with regard to the first line by T, the second line will be delayed with regard to the first line by 2T and so on and the M-th line will be delayed with regard to the first time by (M−1) T. The time delay may be predetermined, but may also be determined during the operation of the sensor, e.g. for different targets, or even be determined in real time based on the current conditions and geometric relations.

It may be provided that the sensor is arranged to determine a linear combination of the output of corresponding sampling cycles of said sensor lines, wherein a sampling cycle corresponds to that of an immediately preceding sensor line, if the start of this sampling cycle is delayed by said time delay with regard to the start of the sampling cycle of the immediately preceding sensor line. The correspondence is mutual and a sampling cycle corresponding to another sampling cycle corresponds to all sampling cycles corresponding to said other sampling cycle.

In the simplest case, said linear combination may just be the sum of said outputs, i.e. the outputs are just added. The patent may provide that for each element of the sensor lines the output of corresponding sensor elements in said sensor lines in corresponding sampling cycles is added, given the case after multiplication with an associated factor, to the value of a common storage element and the storage element will be read out to yield the value of the corresponding line element of the entire sensor after the last of said corresponding sampling cycles has been completed and the corresponding output added to the storage element. Subsequently, this storage element may be reset and used for the acquisition of a new pixel image. It may also be provided that the output of an immediately preceding sensor line is added, given the case after multiplication with an associated factor, to the output of a sensor line and the resulting number will be treated as the output of said sensor line, i.e. for each line, the sum (or linear combination) of the output of all preceding lines will be added to the output of this line.

Alternatively, the invention may provide that the output of each sensor line (except, of course, the last that does not have a subsequent line) is delayed by said first time interval with regard to the subsequent sensor line and the output of the last sensor line and the delayed output of the remaining sensor lines are added so that images of the sensor lines are combined that were acquired with said time delay between subsequent sensor lines.

It may also be provided that the output of each sensor line is resealed to a resolution that is less or equal to the resolution of the line image of that sensor line that has the lowest resolution among said line images acquired by said sensor lines or to a preferably predetermined resolution that is lower than the resolution of any of the line images acquired by any of said sensor lines to be added and the value of corresponding pixels in said line images after resealing is added to yield the output of the entire sensor for said pixel element. In certain embodiments said predetermined resolution may be determined in advance by determining the resolution for the least favourable case. Typically this will be the case of the first or last line. If, for example, a and M, the number of sensor lines, are known, e. g. because α is determined by the system geometry and/or by process requirements or process prescriptions, one can calculate a lower limit for the resolution that can be achieved, which may be taken as said predetermined resolution to which the images are to be downscaled.

Preferably, said sensor lines are parallel and adjacent to each other and preferably follow straight lines. In preferred embodiments, the order in which said line images are taken corresponds to the sequence of the sensor lines in the sensor as a whole.

In one embodiment said sensor lines are provided on a semiconductor chip.

Using techniques of semiconductor manufacturing and providing the sensor lines as an integrated structure on a semiconductor chip, it is possible to provide a sensor with sensor lines that are aligned with high precision and to keep deviations of the dimensions and physical properties of the sensor elements and the sensor lines as a whole at a minimum. In a preferred embodiment, the chip comprising the sensor lines comprises an integrated circuit suitable for controlling the image acquisition of the sensor lines and their sensor elements completely or in part. It may especially comprise an integrated circuit providing for the synchronization of different sensor lines and for the proper timing of the image acquisition or sampling cycles. The integrated circuit may also comprise logic to process or partly process the output of the sensor lines and of the sensor as a whole. Preferably, the integrated circuit contains logic for adding the output of the different sensor lines and/or multiplying the output of a sensor line with an associated factor and/or introducing a delay between the output of sensor lines, as described above. Alternatively, a phase difference between different channels, combining the output of different sensor lines and/or introducing the above-mentioned delay may be effected by external circuitry, especially by a Field Programmable Gate Array (FPGA) coupled with said integrated circuit.

A sensor as described above may especially be a sensor for recognition of images on surfaces of articles or other targets in relative motion to the sensor, in particular on articles that are moving past the sensor on a conveying device, and especially a sensor for reading optical codes and/or characters and/or symbols on a surface of an article or another target, and be specifically adapted for this purpose.

The patent also provides for a system for acquisition of images on a moving target, in particular a system for the acquisition and recognition of images on surfaces of objects, especially for reading optical codes, such as barcodes, characters or graphical or other optical symbols on a target surface, comprising a conveyor for carrying target objects and a sensor as described above The patent especially provides for an image acquisition system comprising such a sensor and a conveyor, wherein the sensor is stationary. In this case, the relative speed of the target object with regard to a sensor is the conveyor speed.

In an embodiment of the system, the sensor is arranged at the side or above a conveyor at such a distance that for any position of a target surface of an article located on the conveyor the difference in reading angle of the same image line for any two sensor lines of said sensor is less than 1°, preferably less than 0.1° and in specific embodiments less than 0.05°.

In this case, the lines connecting a sensor line to its projection on the image surface are approximately parallel in the vicinity of the image surface so that variations in line width are negligible.

It may also be provided that in a system as mentioned above, the sensor is arranged at the side of the conveyor and its distance from the closest edge of the conveyor $D_T$ is larger than the corresponding value of S·M, wherein S(d) is defined, as above, as the distance between the projection of two consecutive lines of the sensor on a plane orthogonal to the optical axis at distance d and M is the number of sensor lines in the sensor. More specifically, it may be provided that (M S($D_T$))/($D_T$) is less than 0.01, preferably less than 0.005, more preferably less than 0.001 and, in specific embodiments, 0.0008 or less.

Alternatively or additionally, a sensor may be arranged above the conveyor surface. It may be provided that the sensor is located above the conveyor at a distance $D_{CS}$ from the conveyor surface, wherein (M S($D_{CS}$−H/cos α))/($D_{CS}$−H/cos α) is less than 0.01, preferably less than 0.005 and more preferably less than 0.001, H being an upper threshold to the height of targets that is possible in the system, permitted in system and/or accepted by the processing means of the system (i.e. the processing means of the system will only process the acquired data, if the height of the target is less than H and return an error otherwise) and α is defined as above. It should be noted that a corresponds to the angle between the optical axis of the sensor and a line normal to the conveying surface.

Since the sensor is stationary with regard to the conveyor, knowing the range of heights within a target or between targets, a suitable distance between the conveyor surface and the sensor itself can be determined in advance, knowing the range of heights.

In this regard it should be understood that the relevant distance is not necessarily the distance between the sensor housing and the conveyor, but the length of the light path from the sensor to the conveyor edge. Redirecting light by mirrors or the like, a longer light path and thus a longer distance in the above sense may be created without changing the distance of the sensor proper from the conveyor.

Additionally or alternatively, optics may be provided that reduces the variations in the angle of light rays connecting the boundaries of the image pixels with the boundaries between adjacent sensor lines.

In an embodiment of the system, the system comprises optics directing the light from the target surface to the sensor such that at the target surface or in the vicinity thereof, light rays emanating from the target surface and imaged on the boundaries between sensor lines are parallel or approximately parallel.

In this embodiment, the optics causes said light rays to be parallel or at approximately parallel. Differently spoken, the optics parallelize virtual light rays emanating from the boundaries of said sensor lines and impinging on the target surface, thus separating the projections of said sensor elements on the target surface from each other. In this way it can be achieved that light rays emanating from the boundaries of the image pixels that are parallel or almost parallel to each other will be imaged on the boundaries of the sensor lines.

The system may comprise devices external to said sensor that determine the velocity of the target, the distance of the sensor from the target, the angle between the optical axis of the sensor and the velocity vector and/or the angle between the target surface and a plane perpendicular to the optical axis. For example, the speed of the target can be determined by light barriers or by measuring the speed of the conveyor, e.g. by an encoder, as is well known in the art. The distance may be measured by light barriers, triangulation, time-of flight methods or in any other suitable manner, which may even include mechanical or RF based methods. Alternatively, the distance may be determined from data about the system geometry and the target geometry. Angles may e.g. be determined by subsequent distance measurements.

The patent also provides for a method of acquiring an image, especially the image of an optical code and/or of one or more characters and/or of one or more optical symbols, by means of a sensor comprising a plurality of sensor lines each rendering line images in a temporal sequence, comprising capturing a first line image by different sensor lines at different times, the minimum difference of which is a first time interval, for each of said sensor lines, capturing the next line image in said temporal sequence at a time which differs from the time of capturing said first line image by a second time interval, combining line images captured at said different times to yield a line image of the entire sensor wherein the second time interval is less than the first time interval.

The line images combined to form the line image of the entire sensor may be captured each at a different time and each by a different sensor. It may, however, also be provided that at one or more, especially each of said different times a group of line images is captured, wherein the line images of these groups and, given the case, individual line images, which were captured at said different times are combined to yield the line image each line image of the entire sensor.

The patent especially provides for a method of acquiring an image, especially the image of an optical code and/or of one or more characters and/or of one or more optical symbols, by means of a sensor comprising a plurality of sensor lines, comprising capturing line images of different sensor lines at times that differ by a first time interval or a multiple thereof, wherein said sensor lines each capture line images at times that differ by a second time interval or a multiple thereof, combining said line images to yield a line image of the entire sensor wherein the second time interval is less than the first time interval.

In applications directed to the acquisition of two-dimensional images, the method may comprise combining a plurality of line images of the entire sensor acquired at different times, typically with a given frequency that defines the pixel resolution in the direction perpendicular to that of the imaged lines, to yield a two-dimensional image.

A method according to this patent may involve any embodiment of a sensor and/or an image acquisition system as described above.

In an embodiment of the method said first time interval depends on the target velocity and/or the distance of the target from the sensor and/or the angle of the target velocity vector to a plane orthogonal to the optical axis of the sensor.

It may further be provided that said second time interval is dependent on the target velocity and/or the distance of the sensor to the target and/or the angle of the target velocity vector to a plane orthogonal to the optical axis of the sensor and/or on the angle between the target surface and a plane perpendicular to the optical axis.

Exemplary dependencies of the first and second time intervals were discussed above.

It may be provided that the sensor is a stationary part of a system for acquisition of images on a moving target, especially a system for the recognition of images on surfaces of objects or other targets in relative motion to the sensor, in particular a system for reading optical codes, such as barcodes or two-dimensional optical codes, characters or graphical or other optical symbols on a target surface, and said system comprising a conveyor for conveying the targets.

In this embodiment the parameters and geometric properties of the sensor are known in advance and hence can be used when setting up the system to determine system parameters that partly or completely determine the above mentioned time intervals. For example, in such systems the angle $\alpha$ designating the complementary angle to the angle between the target velocity and the optical axis of the sensor, is a constant of the system and can be input to the sensor as part of the system settings. It may, however, also be provided to determine the angle $\alpha$ while the target object is passing the sensor.

It may be provided that the start of the sampling interval of each sensor line (except, of course, the first) is delayed with regard to start of the corresponding sampling interval of an immediately preceding sensor by a predetermined time delay.

It may be provided that a linear combination of the output of corresponding sampling cycles of said sensor lines or of corresponding elements of said sensor lines is formed, wherein a sampling cycle corresponds to that of an immediately preceding sensor line, if it is shifted in time by said delay with regard to said sampling cycle of the immediately preceding sensor line, and to all sampling cycles corresponding to the sampling cycle of said immediately preceding sensor line.

It may be provided that the output of each sensor line is rescaled to a resolution that is identical to the resolution of the image of that sensor line that has the lowest resolution among said images acquired by said sensor lines or rescaled to a preferably predetermined resolution that is lower than the resolution of any of the line images acquired by any of said sensor lines to be added and the value of corresponding pixels in said line images after rescaling is added to yield the output of the entire sensor for said pixel element.

The method may provide that said sensor lines are provided on a semiconductor chip.

The method may comprise using a sensor that is arranged at the side of the conveyor or above the conveyor at such a distance from the conveyor and providing objects on the conveyor in such a way and with such properties that for at least one, preferably any target surface of said objects located on the conveyor from which the sensor acquires images, the difference in reading angle of an identical image line for any two sensor lines of said sensor is less than 1°, preferably less than 0.1° and in specific embodiments less than 0.05°. With a given distance of the sensor from the conveyor, especially from the conveying surface and/or from the nearest edge of the conveyor, the maximum height and/or the position of the objects on the conveyor can be chosen such that the above constraint is met. Vice versa, knowing the range of heights or the maximum height of the objects and/or the range of possible positions on the conveyor, a distance of the sensor from the conveying surface and/or from the nearest edge of the conveyor meeting the above constraint can be determined, at which the sensor will be positioned.

The method may comprise using a sensor that is arranged at the side of a conveyor at such a distance from the conveyor and providing objects on the conveyor such that at least for one target surface of the objects on which line images are captured by the sensor its distance from the sensor is much larger than M S, preferably such that (M S(d))/(d) is less than 0.01, preferably less than 0.005 and more preferably less than 0.001, with the definitions of S and M as above and wherein d designates the distance of the target surface from the sensor.

The method may comprise using a sensor that is arranged above the conveyor at such a distance from the conveying surface and providing objects on the conveyor with such heights that for all objects (M S(d))/d is less than 0.01, preferably less than 0.005 and more preferably less than 0.001, with S(d), d and M being defined above. Especially, the method may comprise providing objects on the conveyor having a height that is less than a threshold H, wherein (M S($D_{CS}$–H/cos α))/($D_{CS}$–H/cos α) is less than 0.01, preferably less than 0.005 and more preferably less than 0.001, wherein $D_{CS}$ is the distance of the sensor from the conveyor surface and α is defined as above and corresponds to the angle between the optical axis and the conveying surface.

Since the sensor is stationary with regard to the conveyor, by providing objects within a given range of heights with an upper limit H, an appropriate distance between the conveyor surface and the sensor itself can be chosen, knowing the range of heights or, with a given distance of the sensor from the conveyor surface, appropriate ranges of the height may be determined.

According to a further aspect of the invention a method for the recognition of images on surfaces of objects, especially for reading optical codes and/or characters and/or symbols on a surface of an object or another target is provided, wherein a sensor is used that is in relative motion to said objects and comprises a plurality of sensor lines, each rendering line images, wherein a plurality of line images are combined to yield a line image of the entire sensor, each of which was captured by a different one of said sensor lines and at least some of which, preferably each of which were captured at different times. In this method the object may especially be a moving object. The sensor may especially be a stationary sensor. The invention also provides a system for the recognition of images on surfaces of moving objects, especially for reading optical codes and/or characters and/or symbols on a surface of a object, which comprises a sensor that comprises a plurality of sensor lines, each rendering line images, wherein the sensor is arranged to combine a plurality of line images, each of which was captured by a different one of said sensor lines and at least some of which, preferably each of which were captured at different times, to yield a line image of the entire sensor. The invention provides for the use of this system in a method according to this further aspect of the invention, as described above and in its specific embodiments, especially a use wherein the object is moving, particularly moved by conveying means, and/or wherein the sensor is stationary. The invention also provides for a sensor for use in a method or in a system according to this aspect of the invention. In this aspect of the invention, the sensors, image acquisition systems and/or methods described above may be used. In one embodiment of this aspect, the first and second time interval may be equal. Instead of or additionally to using first and second time intervals, as described above, a resealing in the direction transverse or perpendicular to the direction of the image lines may be carried out, wherein the image is downsampled to the target resolution that especially may be less or equal to the resolution at the maximum angle between the optical axis and a line normal to the target surface that may occur for a given sampling interval. The sampling interval itself is chosen such that at this maximum angle α still satisfactory resolution is achieved. Adopting this approach the time interval between two consecutive images of a sensor line may be the same as the time interval between two consecutive sensor lines capturing the same or essentially the same image.

BRIEF DESCRIPTION OF THE DRAWINGS

Further features and advantages of the invention will become apparent from the subsequent description of features and embodiments with reference to the accompanying drawings.

DETAILED DESCRIPTION OF THE INVENTION

The solution to the problem indicated above to some extent relies on the principle of TDI sensors, which aim at multiplying the sensitivity of single-sensor lines by using a plurality of sensor lines to take a line image. Typically, TDI sensors consist of M parallel sensor lines, also called TDI stages, wherein M≥2. These sensor lines are arranged with regard to a moving target in such a way that they consecutively and subsequently to each other take an image of the same line. During each acquisition interval or sampling interval of a sensor line, the electrical charges corresponding to image pixels acquired by the sensor line are shifted to the following line and added to the charges sampled by this line. When the last sensor line has sampled the line image, the aggregate charges sampled by the consecutive sensor lines constitute a line image. With an appropriate choice of the sampling interval, the same line on the target surface will be sampled M times so that the total sensitivity of the sensor consisting of this plurality of sensor lines is M times higher.

Figure 1:
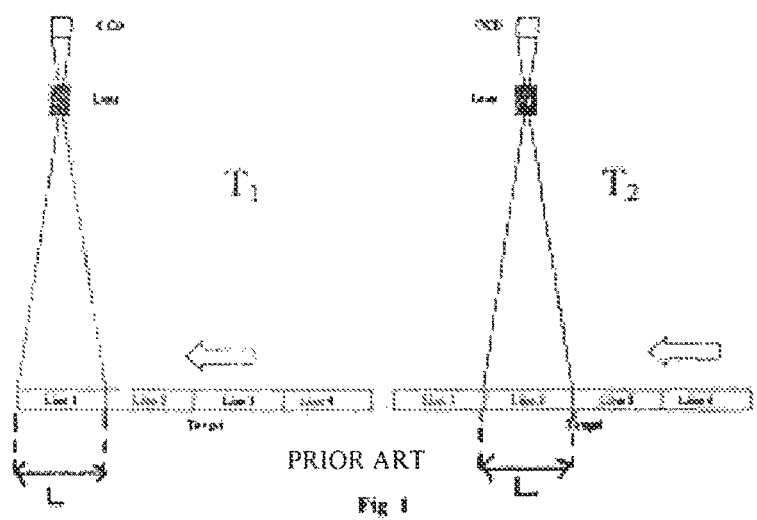
FIG. 1 illustrates image acquisition by a single linear sensor when the target surface is orthogonal to the optical axis.
Figure 2:
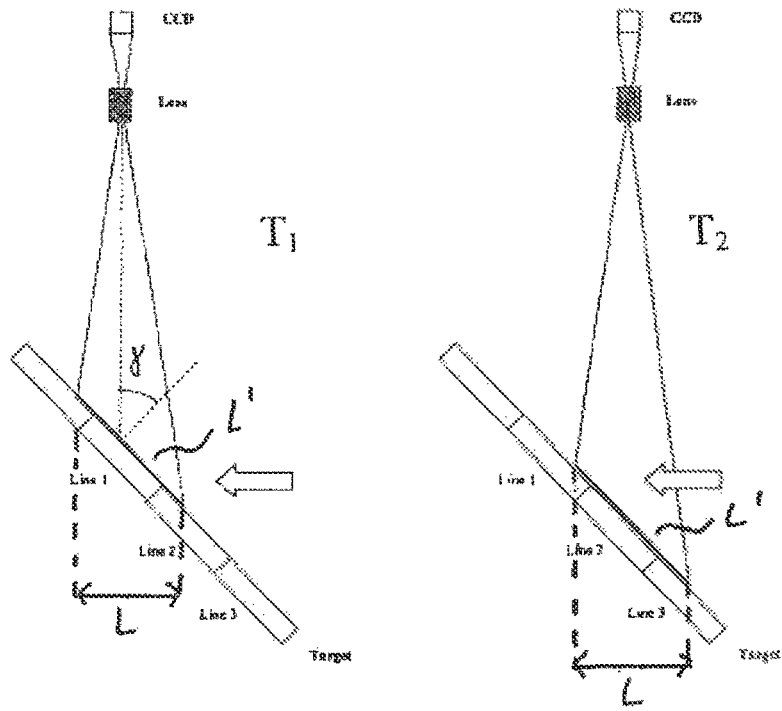
FIG. 2 illustrates image acquisition by a single linear sensor when the target surface is not orthogonal to the optical axis.
Figure 3:
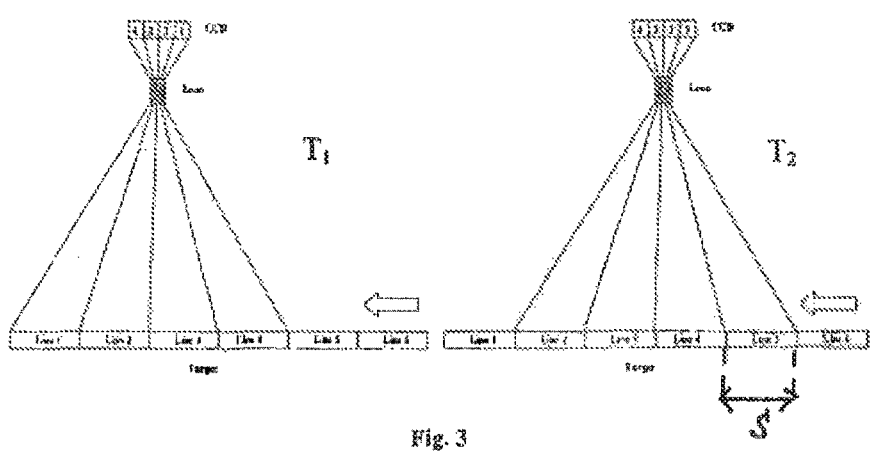
FIG. 3 schematically illustrates the principle of a TDI sensor.

FIG. 3 schematically illustrates the above principle. Adjoining consecutive image lines (lines 1 to 4) on a target surface perpendicular to the optical axis of a sensor (CCD) and having an identical step S in the direction of movement of the target (indicated by the arrow) are imaged to adjoining sensor lines 1 to 4 of the sensor. At time $T_1$ image line 1 is imaged to sensor line 4, image line 2 is imaged to sensor line 3 and so forth. At a certain time $T_2$, the target has moved by a distance S and thus image line 2 is imaged to sensor line 4, image line 3 is imaged to sensor line 3, image line 4 is imaged to sensor line 2 and image line 5 is imaged to sensor line 1. In other words a second image of lines 2 to 4 is taken, but by different sensor lines. More specifically, each of these lines is captured at $T_2$ by a sensor line that is subsequent to the sensor line that captured the image of this line at time $T_1$. If the integration interval or sampling interval, i.e. the time difference between subsequent image acquisitions by the sensor, is pre-determined depending on the speed V of the target, such that the target just moves by a distance S between two image acquisitions, the same line will be imaged by all sensor lines 1 to 4 at different times that differ by said time difference or a multiple thereof. Adding the output of these sensors resulting from the acquisition of identical lines, one effectively achieves a higher sensitivity and, in consequence, the setting of a diaphragm and also the illumination power can be chosen in a way more favourable for the task, e.g. capturing and recognizing optical codes, characters and/or symbols. In this example the sensor comprises CCD sensor lines, but it could also be implemented with another technology, e.g. with the CMOS technology.

The integration interval or sampling interval $P_0$ for a given distance S, corresponding to the distance between the projections of two sensor lines on the target surface, which in the illustrated example also corresponds to the width of an image pixel acquired by the sensor, will depend on the speed V of the target. S, on the other hand, depends on the sensor optics and the distance d of the sensor from the target. The sampling interval $P_0$ is given by $$P_0(V, d) = \frac{S(d)}{V} \quad (1)$$

For a simple lens configuration S(d) is determined by $$S(d) = Ccd\text{LineStep} * \left(\frac{d}{F} - 1\right) \quad (2)$$

wherein
CcdLineStep is the distance between the lines on the CCD
d is the distance between the sensor and the target and
F is the focal length of the lens.

In many applications the distance between the projections of the lines of the CCD on the target will be equal to the distance between two pixels, i.e. the pixel dimension, although this is not necessarily the case.

It is evident from the foregoing that an accurate detection requires that $P_0$ be determined with high precision, which in turn means that the line projection distance S and the speed V must be determined with high precision. If the sampling interval is not chosen correctly, the sensor lines 1 to 4 will detect lines that deviate from each other, which will result in more or less pronounced blur effects in the direction of target movement. These undesired effects increase with increasing M, the number of sensor lines in the CCD sensor, as deviations between the images taken by the different sensor lines accumulate.

Figure 4:
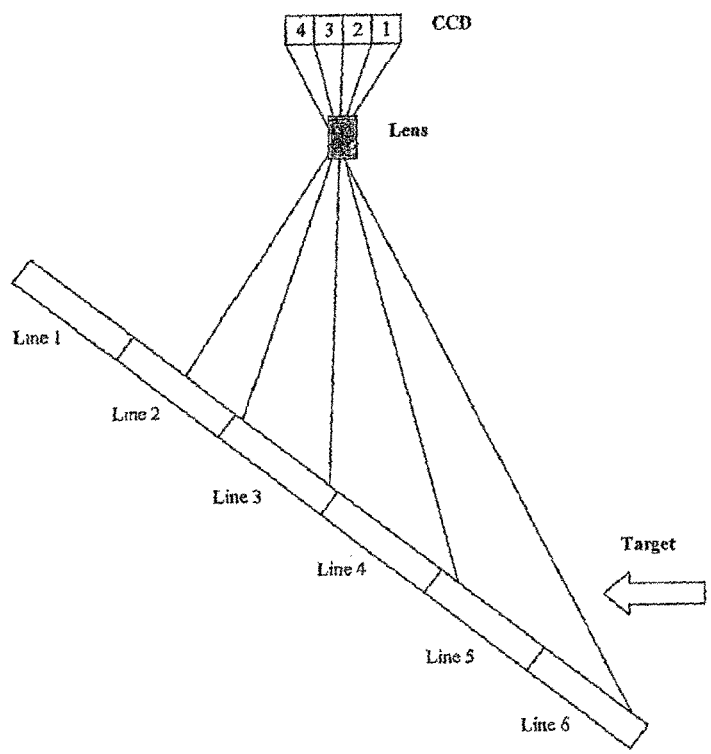
FIG. 4 schematically illustrates the problems of a TDI sensor with a target surface that is not orthogonal to the optical axis.

TDI sensors have, however, not been designed to be used with surfaces that are inclined to a plane perpendicular to the optical axis of the sensor. In fact, if one uses the conventional approach described above, several problems will arise when the object surface is inclined to a plane orthogonal to the optical axis of the sensor. This situation is illustrated in FIG. 4. Since the sampling interval $P_0$ depends on the distance d of the target from the sensor and this distance varies over the object surface, one cannot determine a sampling interval $P_0$ that safeguards that the different sensor lines of the TDI sensor will sample the same line image, while the target passes the sensor, or, in other words, that the image taken by the various sensor lines at times that differ by the respective multiples of $P_0$ are the same or at least approximately the same. The second problem is that the width of the projection of a sensor line onto the target surface is different, depending on the position of the line on the target surface, as illustrated in FIG. 4 and hence the resolution of the image in the direction of movement of the target varies for different portions of the target surface.

Figure 5:
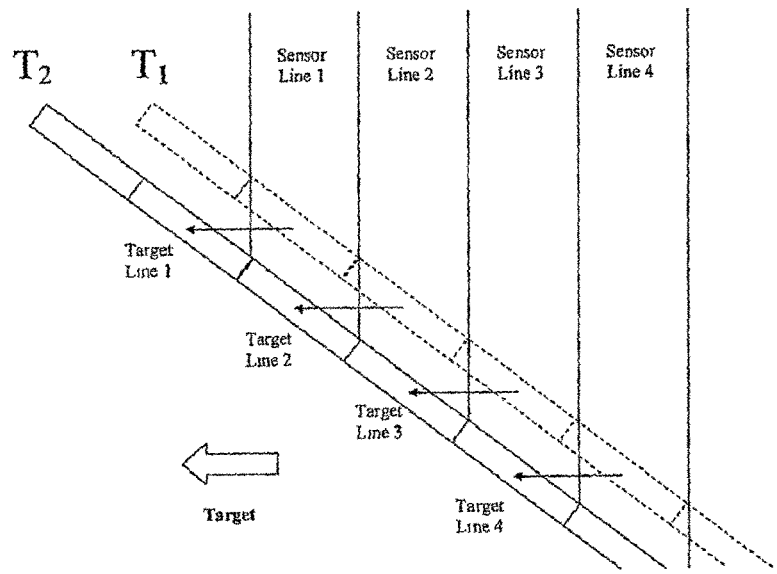
FIG. 5 schematically illustrates the situation of a TDI sensor with a target surface that is not orthogonal to the optical axis, when the distance of the sensor from the target surface is large.

This latter problem can, however, be partly alleviated, if the target lies at a sufficiently large distance from the sensor so that the variations in distance are small, compared to the distance itself or if the distance from the sensor is large, compared to the sensor line projection distance S, especially if the value of M, i.e. the number of sensor lines in the TDI sensor, is small. If the distance of the target from the sensor is large, the lines projecting the pixels on the target can be considered parallel for practical purposes. In practical applications the maximum angle between two such lines can be as little as 0.1° or less. For example, a typical distance S between image lines is 0.1 mm. A typical value for d is 2000 mm. Taking an exemplary value of M=16, which may be more than is the case in many applications, the distance between the first and last line is 1.6 mm. For these conditions the angle between the view planes of the first and last line will be about 0.046°. The above is illustrated in FIG. 5. If the lines projecting the pixels on the target are approximately parallel and if the target moves orthogonally to the sensor axis, i.e. parallel to the plane in which the sensor lines lie, the same target line will be detected by subsequent sensor lines at the same distance. In case of FIG. 5 the sensor line projection distance S is also equal to the line width L. Hence, if the integration interval or sampling interval is $P_0(V,d)$ according to equation (1), the TDI effect will be achieved. The resolution will, however, be reduced by cos δ, wherein δ is defined, in a plane orthogonal to the projection of the sensor lines on the target surface, as the angle between a line orthogonal to the velocity vector and a line normal to the target surface. However, as can be readily seen from FIG. 5, the TDI effect will only be achieved, if the target moves by the distance S during the time interval $P_0$, wherein S is the distance between the projections of sensor lines on the surface orthogonal to the sensor axis at distance d. In consequence the resolution of captured images will vary, depending on δ, if surfaces with a different inclination angle δ pass the sensor. In other words, with the approach mentioned above, it is not possible capture images with a given resolution and simultaneously using the TDI effect.

According to one embodiment of the invention, this problem can be solved in cases where the target velocity vector is perpendicular to the optical axis of the sensor by arranging the distance and the speed of a conveyor (or another device that determines the target velocity) in such a way that for a given maximum angle δ, e.g. δ=45°, the acquired image will have a resolution that is sufficient for the contemplated purposes, e.g. code or character recognition. Whereas the resolution will be higher, if the angle δ is smaller than said maximum angle, an image having this higher resolution can be downsampled to a (lower) target resolution in a subsequent processing step so as to achieve images with a common resolution. This target resolution may be lower than or equal to the resolution for said maximum angle δ.

Figure 6:
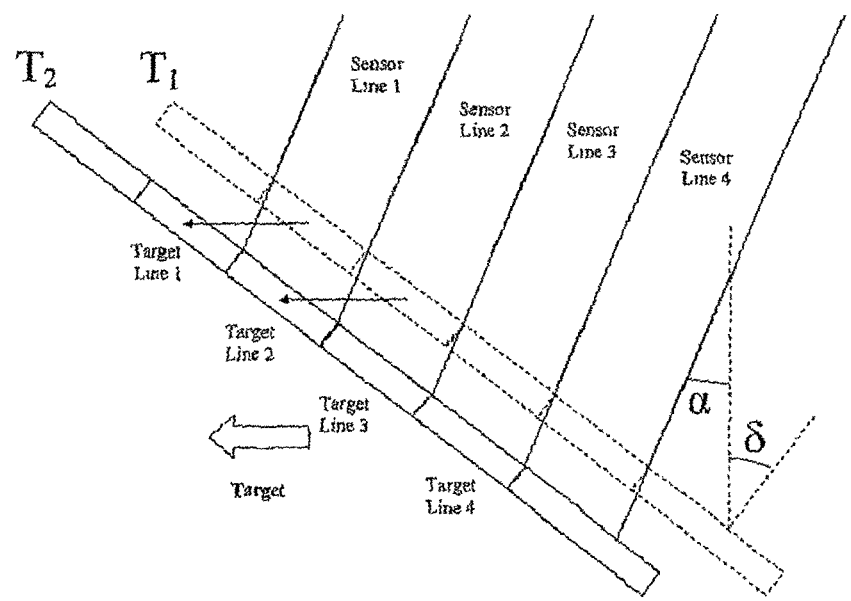
FIG. 6 schematically illustrates the situation of a TDI sensor with a target surface that is not orthogonal to the optical axis, when the distance of the sensor from the target surface is large and the optical axis is not orthogonal to the direction of movement.

If the direction of movement of the target is not orthogonal to the optical axis of the sensor, the inclination of the direction of movement to the optical axis of the sensor needs to be additionally taken into account. Geometric considerations illustrated in FIG. 6 lead to a sampling interval $P_0$ that is dependent on V, d and a and given by $$P(V, d, \alpha)_0 = \frac{S(d)}{V * \cos(\alpha)} \qquad (3)$$

wherein V and d is defined as before and a indicates the complementary angle to the angle between the direction of movement and the optical axis.

Figure 7:
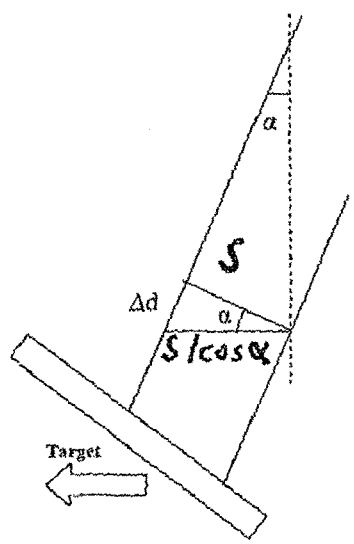
FIG. 7 illustrates the change in distance d in the scenario of FIG. 6.

As is illustrated in FIG. 7, a non-vanishing angle α, however, also results in a change of the distance d between two subsequent lines, Δd, which is given by $$\Delta d(d,\alpha) = S(d) * tg(\alpha) \qquad (4)$$

If the target is at a large distance from the TDI sensor, the variations in the pixel dimensions in the direction of velocity V (L or L', respectively) are small and sufficiently small to be disregarded for purposes of optical symbol or optical code recognition, as long as α is well below 90°. For example, with L(d) given by equation (2) and with a pixel dimension of the sensor of 7 μm, a focal length of 135 mm and an angle α of 45°, the relative variations in the length L of an image pixel are about $50 \cdot 10^{-6}$.

Figure 8:
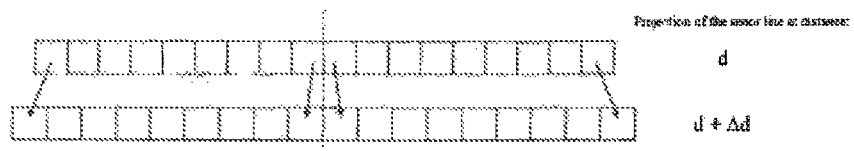
FIG. 8 illustrates the change in pixel size and position between two lines, if the optical axis is not orthogonal to the direction of movement.

In the direction of the image lines, the variations of image pixel dimensions are more significant due to the large number of pixels in a line, as is illustrated in FIG. 8. For example, considering a CCD pixel dimension of 7 μm and 8192 pixels in a sensor line, the outermost pixels are shifted with regard to each other by about 0.42 times the pixel length with the above-mentioned conditions (focal length of 135 mm and α=45°). Thus, when a target line is detected by a sensor line, its length increases or decreases by nearly half a pixel due to the distance variations as compared to the previous line. If M is larger than 2, the difference between the length of the first and the last sensor line may even amount to several pixels. In consequence, summing up the charges for corresponding sensor pixels will result in charges representing different pixel images being accumulated so that the TDI effect will not come about for pixels close to the end of the lines.

Summarizing, using TDI sensors operating in a conventional manner, the resolution of image pixels in the direction of movement on an inclined surface cannot be modified independently from the TDI effect and depends on the angle δ indicating the angle between a line normal to the target surface and a line orthogonal to the velocity vector in a plane orthogonal to the projection of the sensor lines on the target surface. The TDI sensor provides reasonable results only with one scanning frequency, which cannot be increased to balance the loss of resolution. Second, when the direction of movement of the target is not orthogonal to the sensor, the sensor line integration takes place at different distances and therefore the image resolution along the direction perpendicular to the direction of movement, i.e. to the direction of velocity V, changes, thereby preventing an accumulation of an image taken by the different sensor lines.

In a further embodiment, the invention provides to operate a TDI sensor in a way that the sampling interval of individual sensor lines is different from the transfer interval between subsequent lines in the TDI sensor. More specifically, the invention provides that a sampling interval P is determined, that may depend on the velocity V, the distance d and the angles α and δ, and a charge transfer interval $P_t$ that differs from the sampling interval P by a time delay T, i.e. $P_t = P + T$. In fact the charge transfer interval $P_t$ can be chosen to equal the quantity $P_0$ of the traditional TDI sensors discussed above. $P_t$ determines the delay between subsequent sensor lines.

Figure 9:
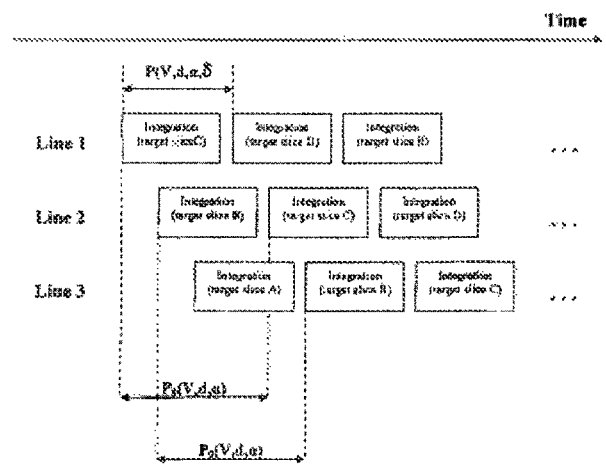
FIG. 9 illustrates the principles of an embodiment of the invention.

The above concept is illustrated in FIG. 9. The first sensor line of the TDI sensor acquires charges corresponding to image pixels in intervals P, i.e. with a sampling frequency 1/P. The next sensor line, line 2 acquires the same image, but with a time delay $P_t = P_0(V, d, \alpha)$ and then samples the subsequent slices or lines D and E with a frequency 1/P or, differently speaking, in time intervals of P. Likewise, the third sensor line takes an image of slices (lines) B, C and D with a time delay of $P_t$ with regard to line 2 and, since line 2 is delayed by $P_t$ with regard to line 1, with a time delay of 2 $P_t$ with regard to line 1.

Providing the time delay $P_t$ between the different sensor lines safeguards that an image of the same line or approximately the same line is taken, whereas appropriate choice of the sampling interval P provides for an adequate resolution.

$P_t$ may be given by equations (1) or (2). S(d) generally depends on the optics employed, but, in some embodiments, may be given by equation (2). P(V,d,α,δ) can be chosen in any manner that yields an adequate resolution, as long as it is smaller than $P_t$. The sampling intervals previously used for single sensor lines may be used. For example, P may be given by $$P = f_{MIN}(\alpha) \frac{CcdPixelDim * \left(\frac{d}{F} - 1\right)}{V}$$

$$f_{MIN} = \cos(\delta_{MAX}) - \sin(\delta_{MAX}) * tg(\alpha)$$

wherein:
CcdPixelDim is the dimension of a pixel on the sensor (that may be different from CCDLineStep)
$\delta_{MAX}$ is the maximum value of angle S defined above.

In order to address the change in the resolution in the direction of the line, each line taken by an image sensor is resealed to predetermined pixel dimensions. For example, in order to remove the variations in pixel size illustrated in FIG. 8, one may start with the center pixels, rescale these to have a predetermined dimension, and subsequently rescale the remaining pixels, moving out to both sides, such that a line image is created that consists of pixels of a predetermined size. Suitable methods for resealing the lines are well-known and comprise, inter alia, different kinds of interpolation, typically a linear or bilinear interpolation, coupled, when necessary, with suitable filters, such as by a binomial filter or a FIR-filter. As a result of this process, there will be less pixels representing the line of the captured image, which do, however, match the pixels of an image acquired by another sensor line with a lower resolution.

To provide a specific and non-limiting example, in the described embodiment it is possible to compute the resealing factor between two adjacent lines based on equation 4, as:

$$R = \frac{L(d)}{L(d+\Delta d)} = \frac{Ccd\text{PixelDim}*\left(\frac{d}{F}-1\right)}{Ccd\text{PixelDim}*\left(\frac{d+\Delta d}{F}-1\right)} = \frac{d-F}{d-F+\Delta d} =$$

$$\frac{d-F}{d-F+S(d)*\tan(|\alpha|)} = \frac{d-F}{d-F+Ccd\text{LineStep}*\left(\frac{d}{F}-1\right)*\tan(}$$

$$R = \frac{L(d)}{L(d+\Delta d)} = \frac{F}{F+Ccd\text{LineStep}*\tan(|\alpha|)}(d-F)$$

Based on the sign of a the resealing will be applied to the line with higher resolution.

Figure 10:
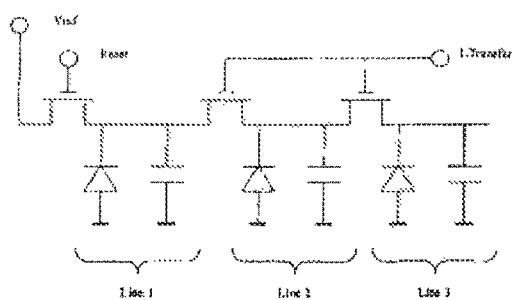
FIG. 10 illustrates a traditional TDI sensor.
Figure 11:
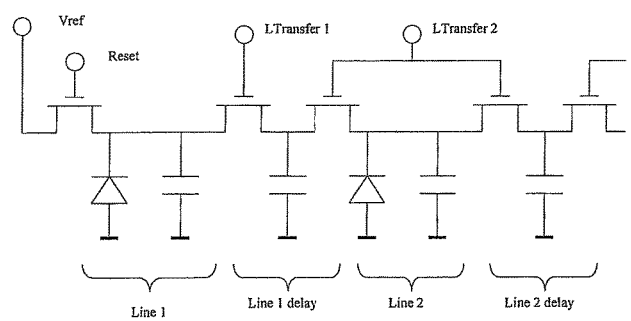
FIG. 11 illustrates an example of a modified TDI sensor according to the invention.

An analogue implementation is illustrated in FIGS. 10 and 11. FIG. 10 illustrates a conventional TDI sensor, wherein the charge accumulated in a first line is transferred when a respective signal is supplied to line "L Transfer". In the modification of the patent shown in FIG. 11, a delay capacitor (Line 1 delay, Line 2 delay) is provided between the sensor lines. A transfer signal on line 2 not only provides that the charge accumulated in line 1 and stored in the capacitor "Line 1 delay" is transferred to line 2, but also that the charge accumulated in Line 2 during the same interval is transferred to the capacitor "Line 2 delay", to be subsequently transferred to sensor line 3.

Figure 12:
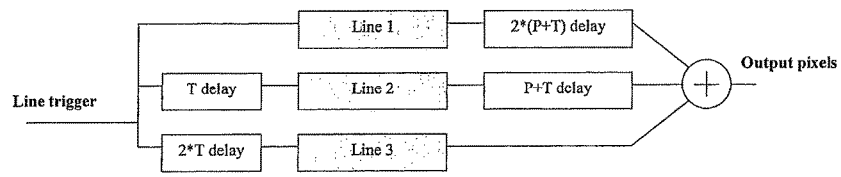
FIG. 12 illustrates an example of a digital embodiment according to the invention.

FIG. 12 shows a possible digital implementation, wherein sensor lines 1, 2 and 3 are triggered by a common line trigger, but with a delay of T or a multiple thereof (T=$P_t$-P).

The line "Line trigger" provides a trigger signal at time intervals P, i.e. with a sampling frequency that provides the appropriate resolution perpendicular to the lines. The delay T safeguards that the time difference between sampling of an image by subsequent lines is $P_t$, rather than P. The output of the lines is delayed by a delay (M-n) $P_t$, wherein n is the line number in the order in which the images acquired. In case of M=3, as illustrated in FIG. 12, the output of the first line is delayed by 2 $P_t$, the output of line 2 is delayed by $P_t$ and the delay for line 3 is zero. The delayed output of lines 1 to M-1 and of line M are subsequently added, thereby providing an accumulation of charges corresponding to an image of the same line. Different implementations may, of course be considered and will be apparent to a person skilled in the art. For example, the output of lines 1 to M may be buffered and read out from the buffer storage and added after the lapse of a time M $P_t$ after the start of the acquisition of the first line image. Alternatively, one may immediately add the sum of the output of all preceding lines to the output of a given line. This may, for example, be accomplished by adding the output from the first line to the second line, adding this sum to the output of the third line and so forth until ultimately the output of all lines has been added.

Whereas FIG. 12 shows an implementation with a delay for the individual lines that is a multiple of a basic delay T, it should be understood that each line may have an input delay associated to it that is larger than zero, but not a multiple of the delay for the second line. In this case the output delay would have to be adjusted accordingly so that the delayed output of all lines but the last (Line 1 and Line 2) will be delivered at the same time as the output of the last line (Line 3).

Figure 13:
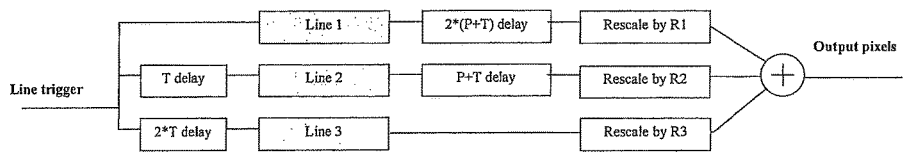
FIG. 13 illustrates a further example of a digital embodiment according to the invention.

FIG. 13 shows an implementation of the present invention for the case of α≠0. Processing is largely identical, but prior to summing the output of the different lines, each line is resealed by an individual resealing factor R1, R2 and R3. More precisely, in the embodiment of FIG. 13 the sensor lines 1 to 3 are triggered with frequency P, but lines 2 and 3 are delayed by a time T and 2 T, respectively. Likewise and as in the embodiment of FIG. 12 the output of lines 1 and 2 is delayed by 2 $P_t$ and $P_t$ respectively. However, prior to adding up the output of the various lines, the output of the lines is resealed, as indicated above. Resealing will start around the sensor central point. In order to simplify the implementation, the rescaling blocks in FIG. 13 should be undersampling blocks, typically resampling through linear interpolation. Depending on the sign of the angle α, the first or the last resampling block in FIG. 13 will have an undersampling 1/1, i.e. the resolution of line 1 or 3, respectively, will not be changed, whereas the other blocks will perform an increasingly higher undersampling in order to downsample the respective line image to the resolution and the image from the first or last sensor line, respectively.

Alternative solutions are readily available also for this embodiment. For example, the output of the lines can be immediately resealed and delayed subsequently. As in the previous embodiment, instead of a delay, the results can be buffered. If the line detection already requires a rescaling in the line direction, as is, for example, proposed in U.S. Pat. No. 7,385,743 B2, a additional rescaling may not be necessary but one may downsample both in the direction parallel to the lines and perpendicular to the lines to a common (lower) target resolution.

As mentioned before, the time interval P is not necessarily constant, but may vary with the line images that are acquired. In this case, the variations in P would need to be additionally accounted for in the delay blocks of FIGS. 12 and 13 to make sure that the images acquired e.g. by Lines 2 and 3 are the same as the image acquired by Line 1, to which they are to be added (cf. FIG. 8), and that the images will be properly combined, e.g., in the shown example, the output of all lines but the last will be delayed to be synchronous to the output of the last line.

The features disclosed in the claims, the specification and the drawings, taken alone or in arbitrary combination, may be relevant for the realisation of the invention in its various embodiments.

The invention claimed is:

1. A sensor for recognition of images on surfaces of objects in relative motion with regard to the sensor for reading optical codes and/or characters and/or symbols on a surface of an object, said sensor comprising: (i) a plurality of sensor lines each adapted to render line images in a temporal sequence, a different one of the sensor lines being configured to capture each of a plurality of line images, and (ii) delay elements in electrical communication with the sensor lines, the sensor lines and delay elements further arranged to combine the plurality of line images of the sensor lines to yield a line image of the sensor, and at least some of the combined line images captured at different points in time.

2. The sensor according to claim 1, wherein the sensor lines and delay elements are arranged to capture line images such that the time difference between two of the different points in time that are closest to each other equals a first time interval ($P_t$), and wherein each of these sensor lines is arranged to capture line images such that, having captured the line image that is to be combined to the line image of the sensor, the next line image in the temporal sequence will be taken after a second time interval (P), wherein the sensor is adapted to operate with the second time interval being less than the first time interval.

3. The sensor according to claim 1, wherein the sensor is arranged with the delay elements in electrical communication with the sensor lines to cause the combined line images of different sensor lines that were captured at times that differ by a first time interval or a multiple thereof, and wherein the individual sensor lines are arranged with the delay elements to capture line images at times that differ by a second time interval or a multiple thereof, wherein the second time interval can be set to be less than or equal to the first time interval.

4. The sensor according to one of claim 3, wherein the first time interval depends on an object velocity and/or a distance of the object from the sensor and/or an angle of an object velocity vector to a plane orthogonal to an optical axis of the sensor.

5. The sensor according to claim 4, wherein the second time interval is dependent on the object velocity and/or the distance of the sensor to the object and/or the angle between the object surface and the plane perpendicular to the optical axis and/or the angle of the object velocity vector to the plane orthogonal to the optical axis of the sensor.

6. The sensor according to claim 1, wherein the plurality of sensor lines form a sequence of adjacent parallel sensor lines, and wherein the delay elements are in electrical communication with the parallel sensor lines such that a start of a sampling interval of each sensor line is delayed with regard to a sampling interval of an immediately preceding sensor line by a predetermined time delay.

7. The sensor according to claim 6, wherein the sensor is arranged to determine a linear combination of the output of corresponding sampling cycles of the sensor lines, wherein a sampling cycle corresponds to that of an immediately preceding sensor line, if its start is shifted in time by the delay with regard to the start of the sampling cycle of the immediately preceding sensor line.

8. The sensor according to claim 1, wherein an output of each sensor line is resealed to a resolution that is less than or equal to a resolution of the line image of that sensor line that has the lowest resolution among the line images acquired by the sensor lines and a value of corresponding pixels in the line images after resealing is added to yield an output of the entire sensor for a pixel element.

9. The sensor according to claim 1, wherein the sensor lines are provided on a semiconductor chip.

10. A system for acquisition of images on a surface of a moving target for acquisition of optical codes, characters and/or graphical or other optical symbols on a target surface, comprising:
    a conveyor for carrying target objects; and
    a sensor including a plurality of sensor lines each adapted to render line images in a temporal sequence, a different one of the sensor lines being configured to capture each of the plurality of line images, and delay elements being in electrical communication with the sensor lines, the sensor lines and delay elements further being arranged to combine a plurality of line images of the sensor lines to yield a line image of the sensor, and at least some of the captured line images captured at different points in time.

11. The system according to claim 10, wherein the sensor is arranged at a side or above the conveyor at such a distance that for any position of the target surface of an object located on the conveyor a difference in reading angle of the same image line for any two sensor lines of said sensor is less than 1°.

12. The system according to claim 10, further comprising optics directing light from the target surface to the sensor such that at the target surface or in the vicinity thereof, light rays emanating from the target surface and imaged on boundaries between sensor lines are parallel or approximately parallel.

13. A method for recognition of an image on a surface of an object for reading optical codes and/or characters and/or symbols on a surface of an object, comprising:
    causing a relative motion between a sensor and the object;
    rendering a plurality of line images;
    delaying line images relative to one another;
    combining the plurality of delayed line images to yield a line image of the entire sensor, each of the delayed line images being captured by a different sensor line and delayed by different delay elements, and at least some of the delayed line images being captured at different times.

14. The method according to claim 13, further comprising:
    capturing a first line image by different sensor lines at different times, the minimum difference of which times is a first time interval,
    for each of the sensor lines, capturing the next line image at a time which differs from the time of capturing the first line image by a second time interval,
    combining the delayed line images captured at the different times to yield a line image of the entire sensor,
    wherein the second time interval is less than the first time interval.

15. The method according to claim 14, wherein the first time interval depends on an object velocity and/or a distance of the object from the sensor and/or an angle of the object velocity vector to a plane orthogonal to the optical axis of the sensor.

16. The method according to claim 14, wherein the second time interval is dependent on an object velocity and/or a distance of the sensor to the object and/or an angle between the object surface and a plane perpendicular to the optical axis and/or an angle of the object velocity vector to a plane orthogonal to the optical axis of the sensor.

17. The method according to claim 13, comprising:
    capturing line images of different sensor lines at times that differ by a first time interval or a multiple thereof, wherein the sensor lines capture line images at times that differ by a second time interval or a multiple thereof; and combining the delayed line images to yield a line image of the entire sensor, wherein the second time interval is less than the first time interval.

18. The method according to claim 13, further comprising fixedly positioning the sensor for acquisition of images on a moving object.

19. The method according to claim 18, wherein fixedly positioning the sensor includes fixedly positioning the sensor at a side or above a conveyor for moving the object, and further comprising providing targets on the conveyor such that for a target surface of the object located on the conveyor, from which a line image is acquired by the sensor, the difference in reading angle of the same image line for any two sensor lines of said sensor is less than 1°.

20. The method according to claim 13, where delaying the line images includes delaying start of a sampling interval of each sensor line with regard to a sampling interval of an immediately preceding sensor line by a predetermined time delay.

21. The method according to claim 13, further comprising adding a linear combination of the output of corresponding sampling cycles of the sensor lines, wherein a sampling cycle corresponds to that of an immediately preceding sensor line, if its start is shifted in time by a delay with regard to the start of the sampling cycle of the immediately preceding sensor line.

22. The method according to claim 13, further comprising rescaling output of each sensor line to a resolution that is less or equal to the resolution of the image of that sensor line that renders a lowest resolution among images acquired by the sensor lines and the value of corresponding pixels in the line images after rescaling is added to yield an output of the entire sensor for the pixel element.

* * * * *